United States Patent
Whitby et al.

(10) Patent No.: US 6,411,332 B1
(45) Date of Patent: *Jun. 25, 2002

(54) DIGITAL CAMERA WITH AN ARTICULATING CAPTURE MODULE

(75) Inventors: Laura R. Whitby, Rochester, NY (US); Joseph S. Toro, Stratford, CT (US); Joao G. Amorim, New York, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/779,776

(22) Filed: Jan. 7, 1997

(51) Int. Cl.[7] .............................................. H04N 5/225

(52) U.S. Cl. ...................................... 348/376; 348/373

(58) Field of Search ................................. 348/373, 376, 348/65, 335, 375; 396/348, 535, 419

(56) References Cited

U.S. PATENT DOCUMENTS

| | | | | |
|---|---|---|---|---|
| 4,072,970 A | * | 2/1978 | Winkler ...................... | 396/348 |
| 4,837,817 A | * | 6/1989 | Maemori .................... | 348/211 |
| 4,916,550 A | * | 4/1990 | Miyake et al. .............. | 358/471 |
| 5,442,453 A | * | 8/1995 | Takagi et al. ............... | 386/118 |
| 5,517,243 A | * | 5/1996 | Kudo et al. ................. | 348/296 |
| 5,559,554 A | | 9/1996 | Uekame et al. ............. | 348/333 |
| 5,729,289 A | * | 3/1998 | Etoh ........................... | 348/333 |
| 5,751,335 A | * | 5/1998 | Bito et al. ................... | 348/375 |
| 5,786,854 A | * | 7/1998 | Slade et al. ................. | 348/373 |
| 5,801,919 A | * | 9/1998 | Griencewic ................. | 348/552 |
| 5,808,679 A | * | 9/1998 | Shih ............................ | 348/335 |
| 6,091,453 A | * | 7/2000 | Coan et al. .................. | 348/373 |

FOREIGN PATENT DOCUMENTS

JP      359033438   *  2/1984   ................. 396/348

OTHER PUBLICATIONS

Richo RDC–1.
Sony DCS–F1.
Casio QV–100.
Vivitar VCB–1.
Video Labs Flexcam.
Altec Lansing Camera.
Review of digital camera in PC Magazine, Jan. 7, 1997.
Connectix QuickCam camera from Connectix QuickCam Home page on the Internet.

* cited by examiner

*Primary Examiner*—Wendy R. Garber
*Assistant Examiner*—Jacqueline Wilson
(74) *Attorney, Agent, or Firm*—David M. Woods; Pamela R. Crocker

(57) ABSTRACT

An electronic camera for capturing an image of an object from both hand-held and stationary positions comprises an imaging module containing an image sensor for capturing the image, a camera body capable of serving as a stand for the camera, an elongated arm for supporting the imaging module at one end and terminating at the other end in a connecting member for connecting with the camera body, and means for pivotally attaching the connecting member to the camera body such that the elongated arm and the imaging module may be seated against the camera in a first position for hand-held imaging and swung away from the camera through an arcuate path relative to the camera body, which serves as a stand, to a second position for stationary imaging. In a further variation, the imaging module is attached to the elongated arm with a flexible support that provides a wide range of imaging module adjustments. Since the camera body nests the articulating arm in one position and supports the arm like a stand in another position, the camera provides a package that can be conveniently hand held for still imaging or firmly parked on a desktop for videoconferencing.

3 Claims, 10 Drawing Sheets

DIGITAL CAMERA WITH AN ARTICULATING CAPTURE MODULE

FIELD OF THE INVENTION

The invention relates to electronic still photography, and in particular to a digital camera having a capture module that is movable with respect to the camera body.

BACKGROUND OF THE INVENTION

Hand-held digital still cameras are known that support an attached imaging module that articulates, e.g. by rotation, with respect to a camera body. See, for example, the model QV-10 camera sold by Casio and the model DSC-F1 camera sold by Sony. The articulation feature is often employed in cameras having a large image display that needs to remain in the user's field of view for image previewing. These cameras are primarily intended to be hand held for still images and consequently are not designed for fixed position imaging, e.g., for videoconferencing from a desktop camera position. If such cameras are placed on a hard surface, and used to capture images from that position, it is awkward, if not impossible, to provide adequate adjustment of the image module for every desired capture position.

Videoconferencing cameras, on the other hand, are not intended for hand-held use on a regular basis. For example, one model simply cradles the imaging module in a holder (e.g., the model QuickCam camera sold by Connectix) and another provides a flexible connection to its holder (e.g., the FlexCam gooseneck camera sold by VideoLabs). In either case, hand-held use is either awkward or requires separation of the camera from its holder. What is needed is a combination hand-held and videoconferencing camera that provides a wide range of imaging module adjustments in a package that can be conveniently hand held for still imaging or firmly parked on a desktop for videoconferencing.

SUMMARY OF THE INVENTION

The present invention is directed to overcoming one or more of the problems set forth above. Briefly summarized, according to one aspect of the present invention, an electronic camera for capturing an image of an object from both hand-held and stationary positions comprises an imaging module containing an image sensor for capturing the image, a camera body capable of serving as a stand for the camera, an elongated arm for supporting the imaging module at one end and terminating at the other end in a connecting member for connecting with the camera body, and means for pivotally attaching the connecting member to the camera body such that the elongated arm and the imaging module may be seated against the camera in a first position for hand-held imaging and swung away from the camera through an arcuate path relative to the camera body, which serves as a stand, to a second position for stationary imaging. In a further variation, the imaging module is attached to the elongated arm with a flexible support that allows further adjustment of the imaging module with respect to the elongated arm.

The advantage of the invention is that the design of the articulating arm provides a wide range of imaging module adjustments. Providing a camera body that nests the articulating arm in one position and supports the arm like a stand in another position further provides a package that can be conveniently hand held for still imaging or firmly parked on a desktop for videoconferencing.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging devices employing electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described are provided in software and/or electronic circuits. Given the system description as provided in the following materials, all such software or circuitry implementation is conventional and within the ordinary skill in such arts.

Figure 1:
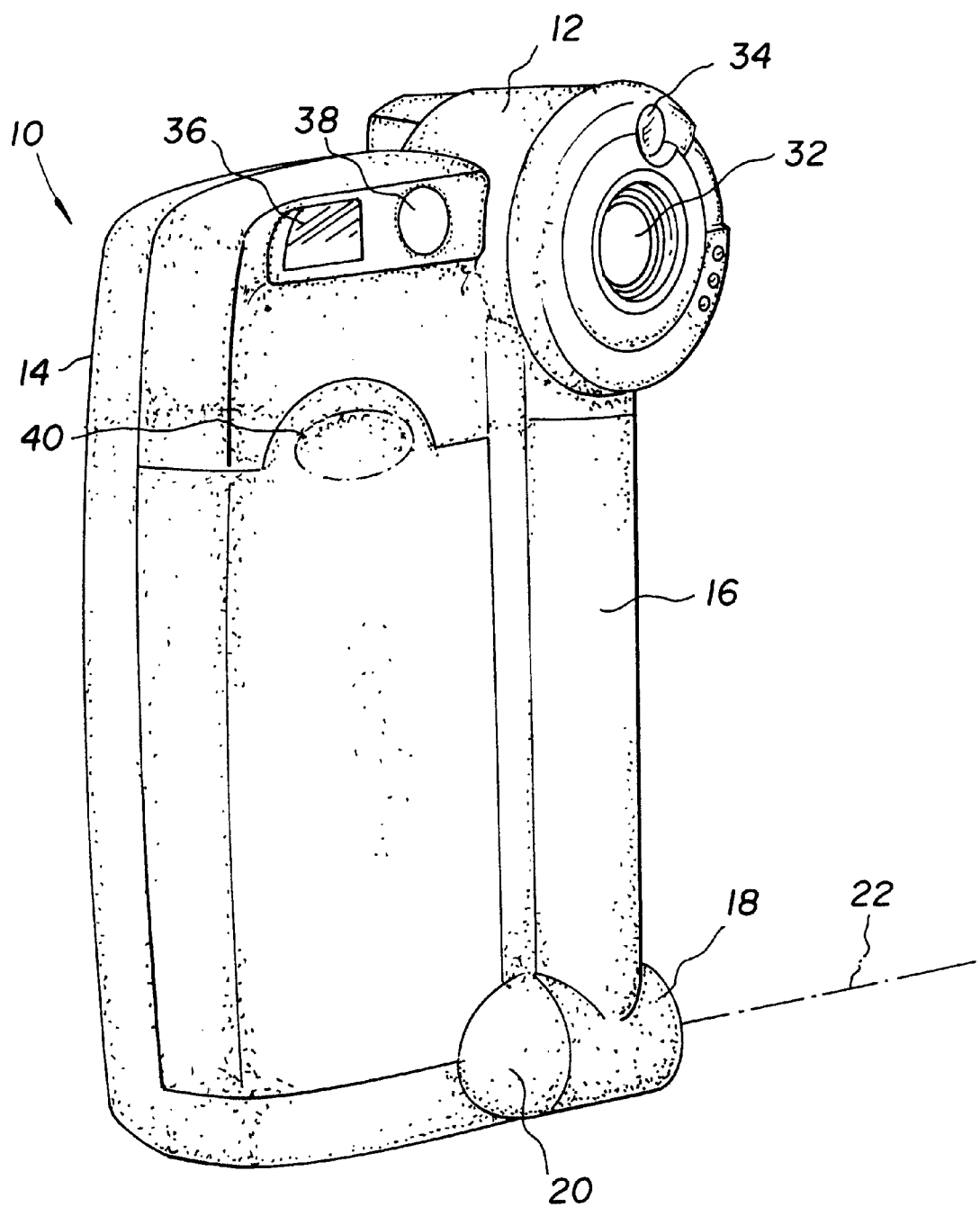
FIGS. 1 and 2 are two views of the front of a digital camera with an articulating capture module according to the invention.
Figure 2:
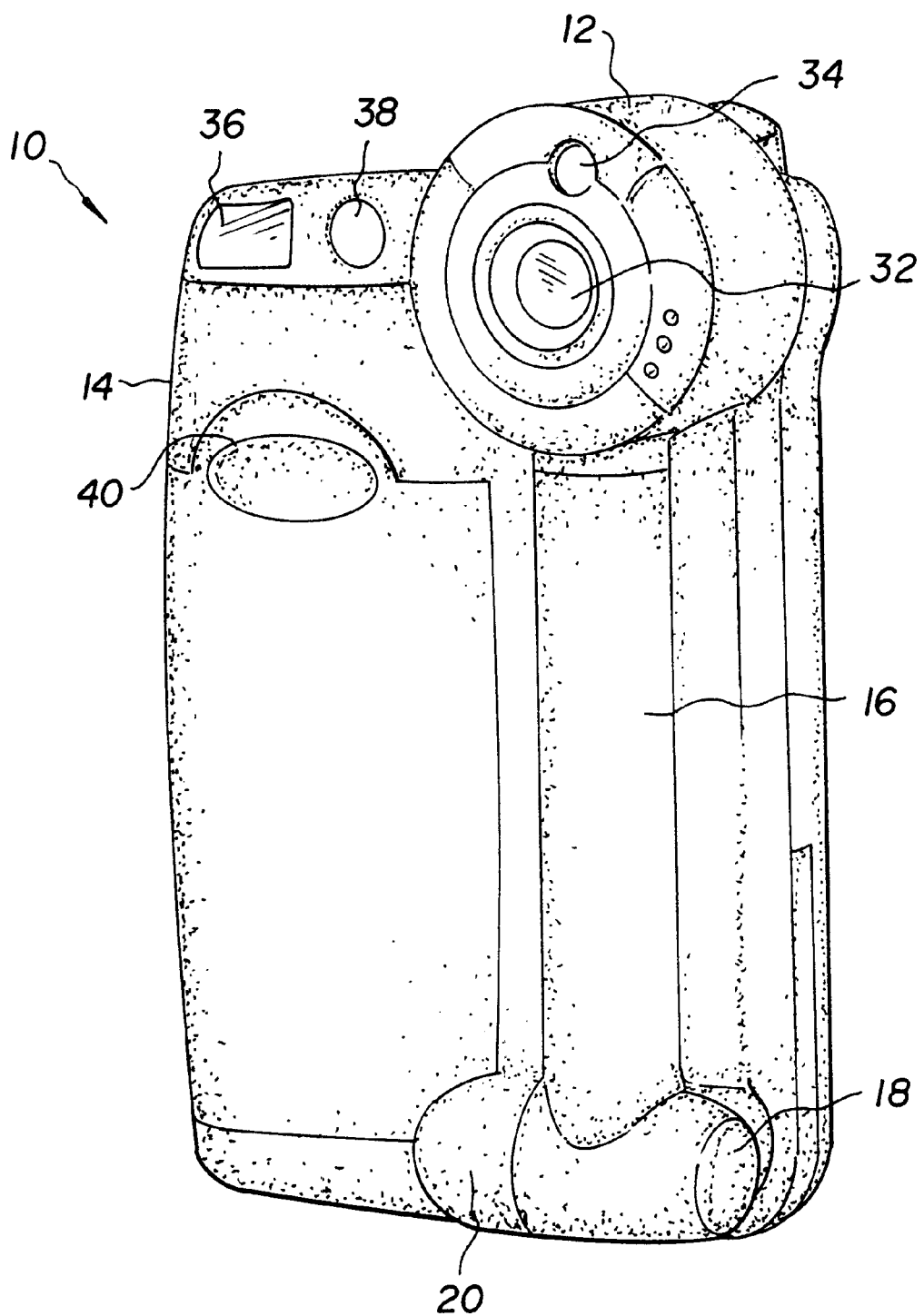
Figure 3:
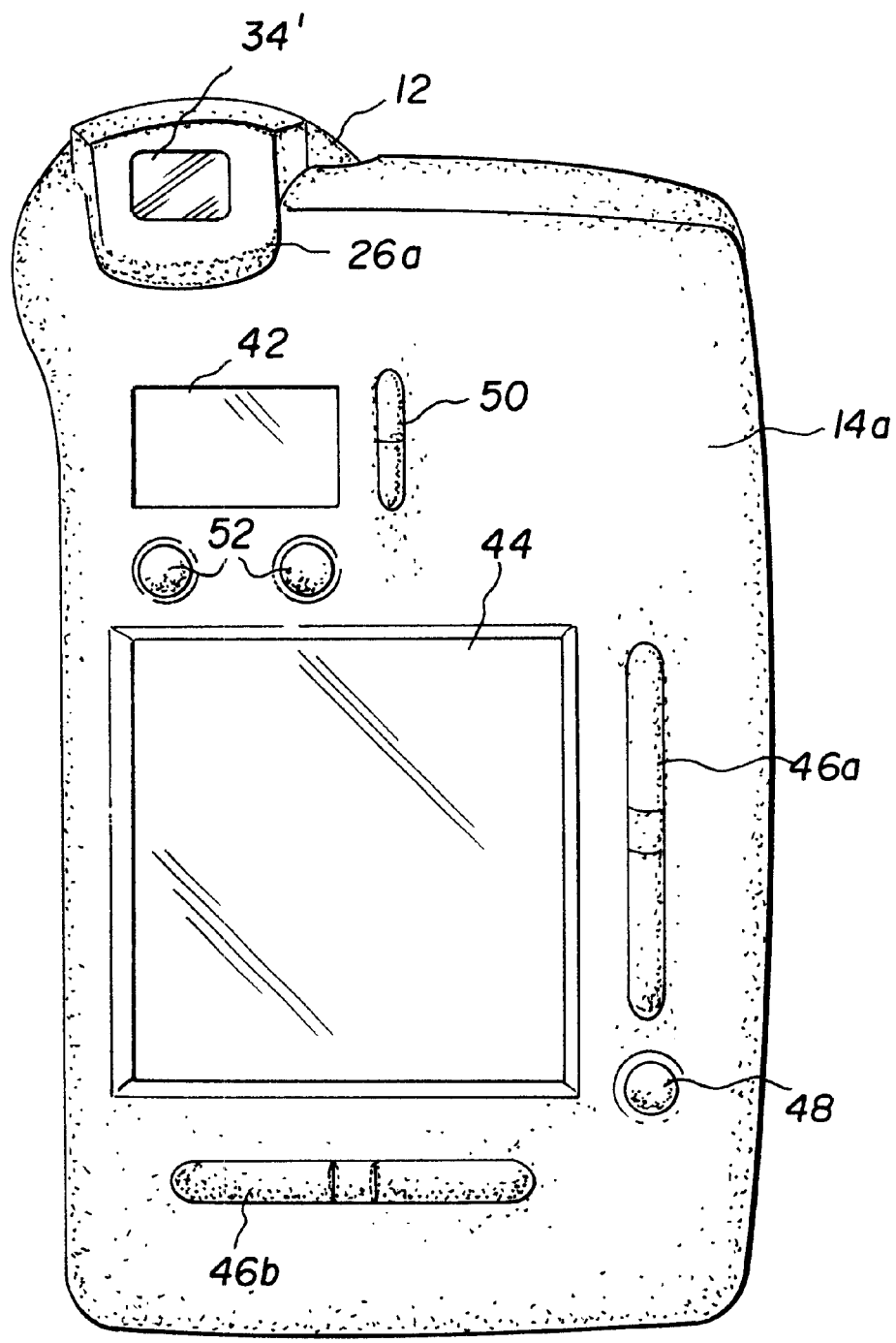
FIG. 3 is a rear view of the camera shown in FIG. 1.
Figure 4:
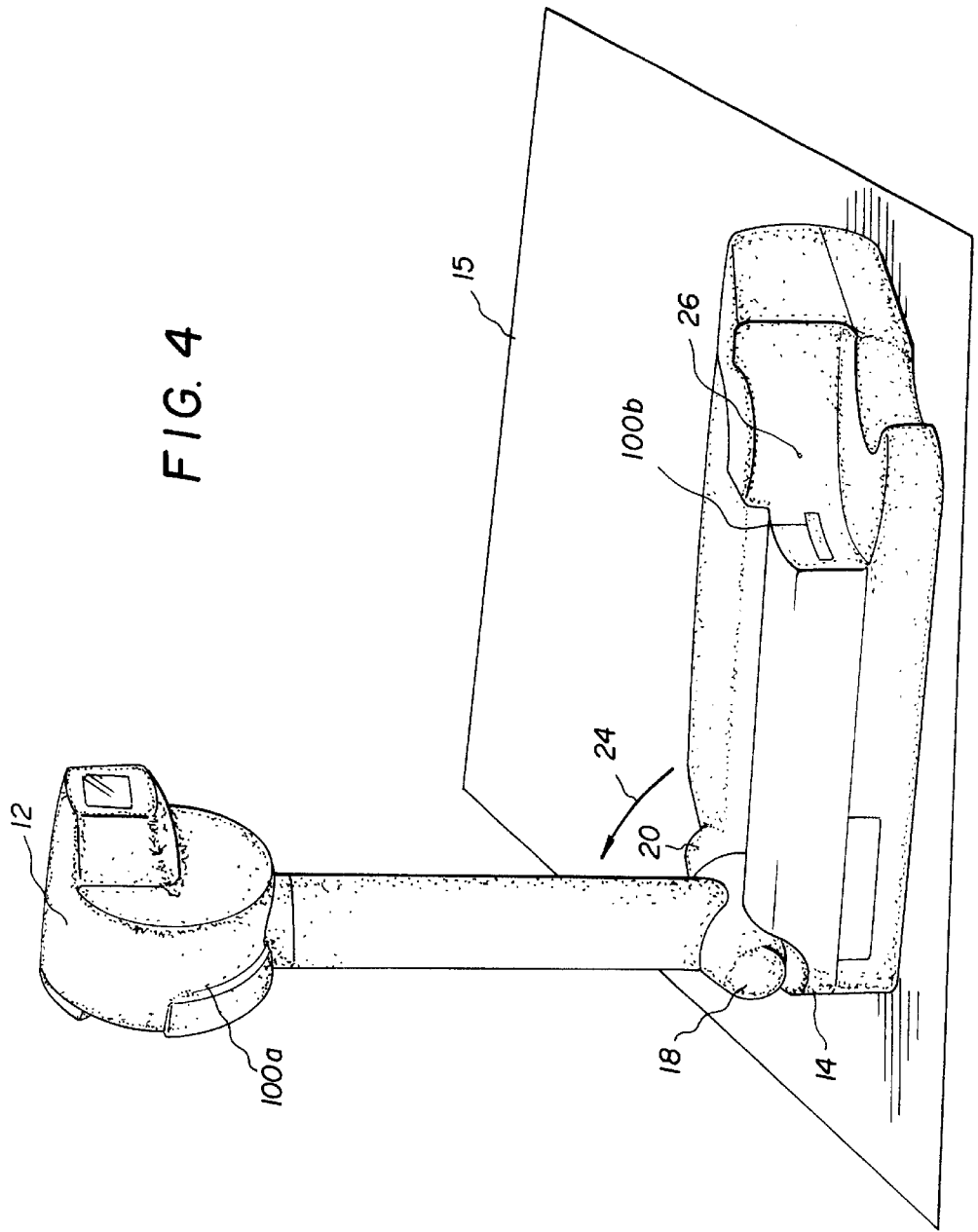
FIGS. 4 and 5 are two views of the articulating imaging module of the camera shown in FIG. 1.

Referring initially to FIGS. 1 and 2, a digital camera 10 according to the invention is shown from the front in two views, each view showing an imaging module 12 resting against a camera body 14. The imaging module 12 is supported on one end of an elongated arm 16, which terminates at its other end in a connecting member 18. The connecting member 18 is rotatably attached to a pivot support 20 on the camera body 14, and is thereby adapted to pivot about a pivot axis 22. Thus, as better shown in FIGS. 4 and 5, the arm 16 and its attached imaging module 12 can articulate with respect to the camera body 14 by swinging away from the camera body 14 through at least a 90° angle 24. As shown in FIG. 3, the camera 10 has a flat back 14a that serves as a base for the camera 10 when it is placed on a flat surface 15 as shown in FIG. 4. In this manner, the elongated arm is pivotally attached to the camera body 14 such that the elongated arm 16 and the imaging module 12 may be seated against the camera 10 in a first position for hand-held imaging and swung away from the camera 10 through an arcuate path relative to the camera body 14, which serves as a stand, to a second position for stationary imaging.

As also shown in FIG. 4, a section of the camera body 14 is removed to form a nest 26 for receiving the arm 16 and the imaging module 12 when they are resting against the camera, as shown in FIGS. 1 and 2. As further shown in FIG. 6, the imaging module 12 is attached to the elongated arm 16 by a flexible linkage 28. The linkage 28 supports the imaging module 12 in a variety of positions such that the articulation of the arm 16 may be more finely adjusted by flexure of the linkage 28. The linkage 28 retracts into an internal recess 30 in the elongated arm 16 so that the positions observed in FIGS. 4 and 5 may be obtained, and so that the imaging module 12 may fit into the nest 26. Electrical connections are maintained between the imaging module 12 and the camera body 14 through the flexible linkage 28, the arm 16, and the connecting member 18. This may entail, for example, a flexible cable connection (not shown) between the linkage 28 and the bottom area of the recess 30.

Referring again to FIGS. 1 and 2, the imaging module 12 includes an optical section 32 for imaging light upon an image sensor (shown in FIG. 8), and an optical viewfinder 34. The front of the camera 10 also includes a flash unit 36, a photocell 38, and a capture button 40. (Alternatively, the flash unit 36 and/or the photocell 38 may be located on the imaging module 12—although this may be unnecessary since the second "videoconferencing" position would typically not require flash lighting or instantaneous exposure control.)

Figure 5:
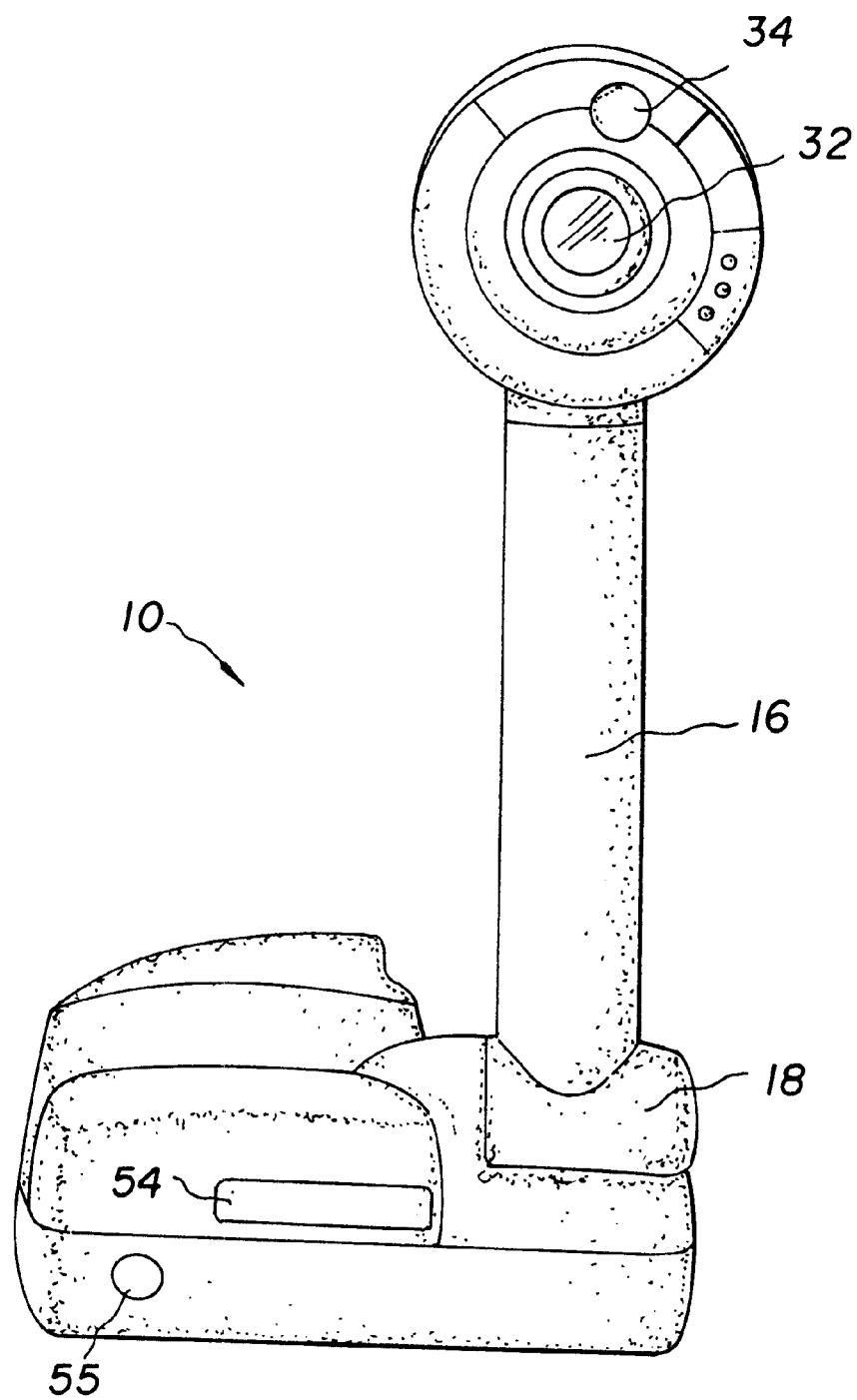
Figure 6:
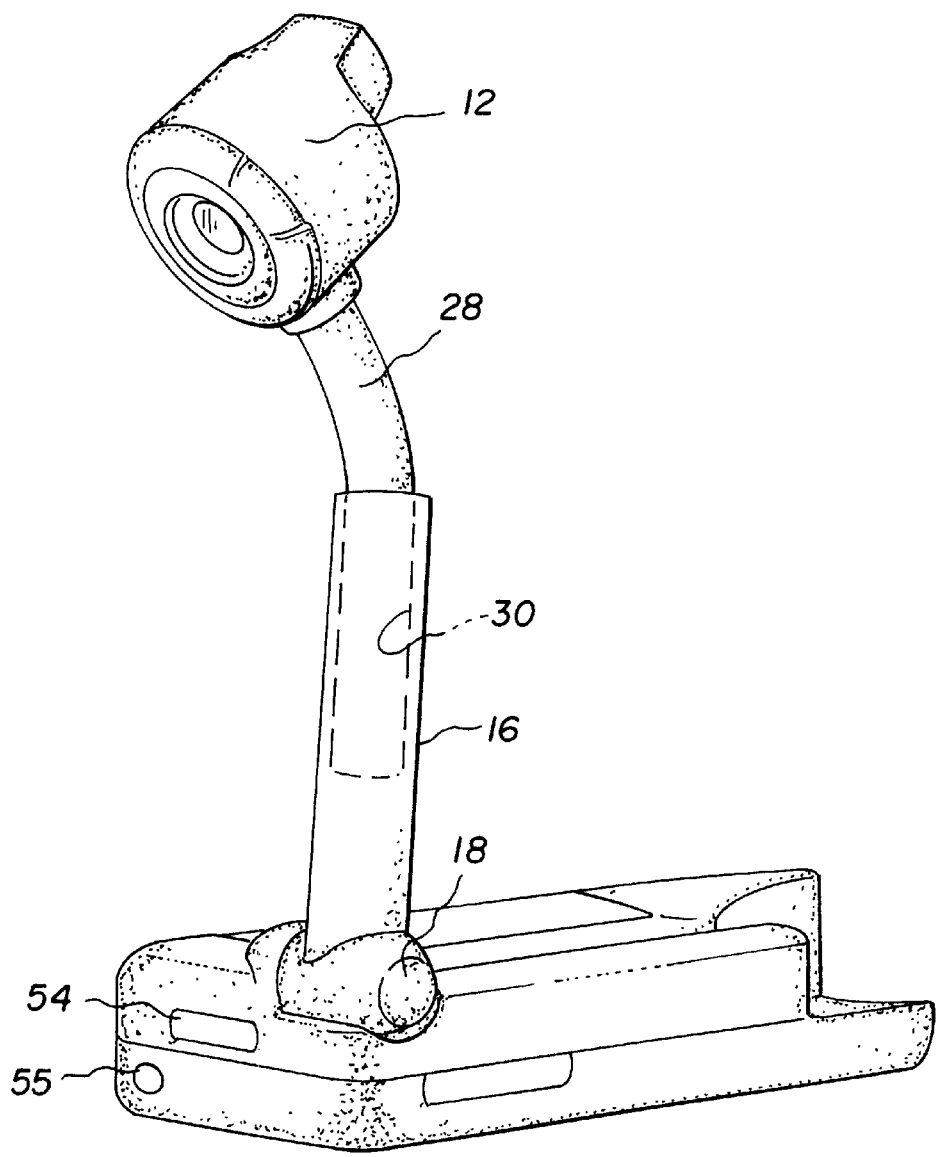
FIG. 6 is a view of the flexure linkage of the articulating imaging module of the camera shown in FIG. 1.

The rear of the camera 10, as shown in FIG. 3, includes a status display 42 and an image display 44. These displays would typically be liquid crystal displays (LCDs). A pair of rocker switches 46a, 46b and a select button 48 control access to the image display 44, while a rocker switch 50 and buttons 52 control access to features displayed on the status display 42. Since the camera 10 is adapted to lie on its flat back 14a, the displays 42 and 44, and their related control buttons and switches, could be recessed into the back 14a. Alternatively, positioning feet (not shown) could be provided at the four corners of the back 14a. A rear end 34' of the optical viewfinder 34 protrudes through a cutaway portion 26a in the nest 26 so that the camera 10 can be used when the imaging module 12 is resting in the nest 26 in its first position. As best shown in FIGS. 5 and 6, the camera 10 also has a memory card slot 54 for receiving a conventional memory card (not shown) that stores images captured by the camera, and a port 55 for connecting with a host computer (not shown). The memory card would typically be useful in the hand-held mode of operation while the host computer connection would typically be used for the stationary type of imaging.

Figure 7:
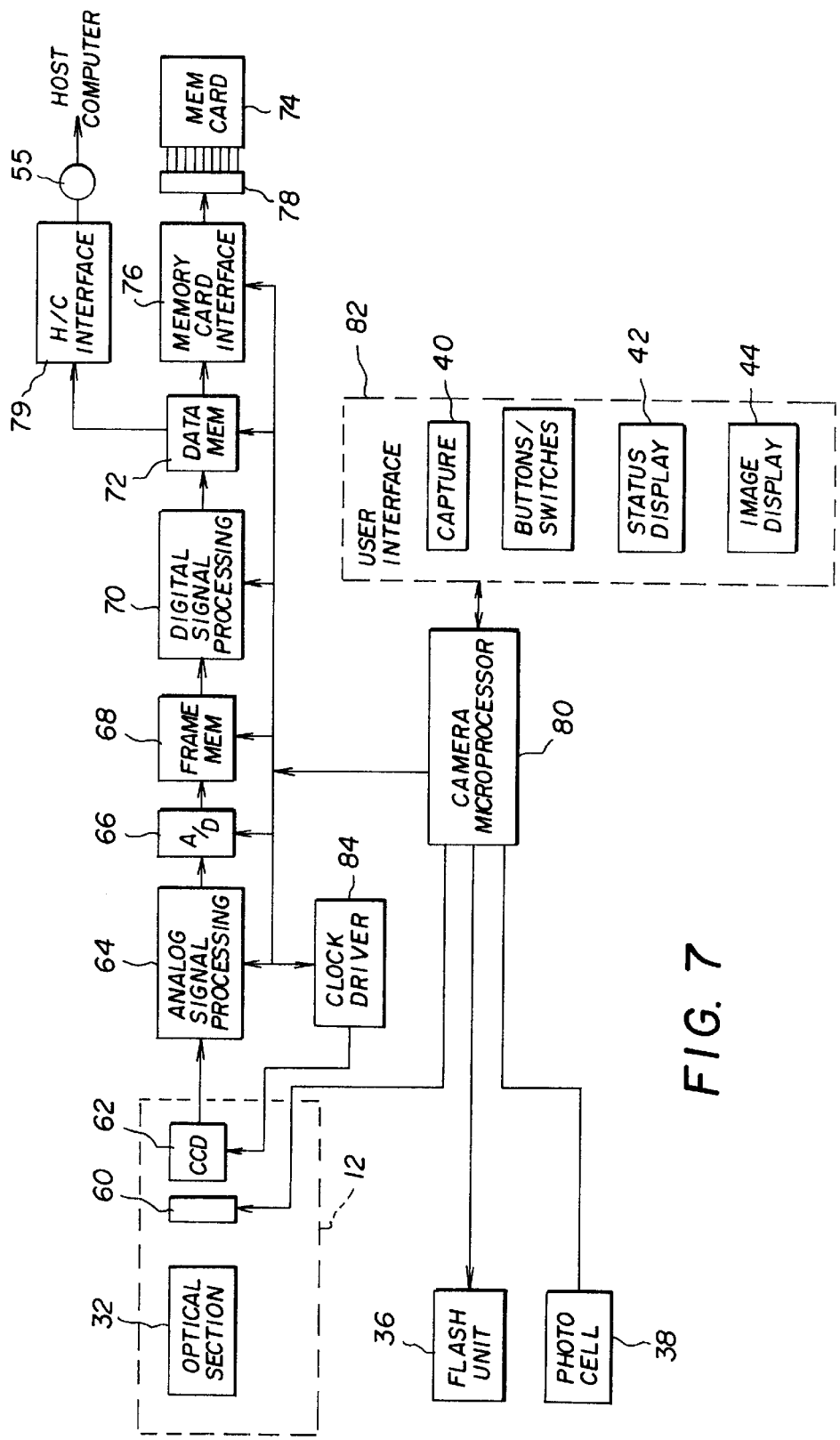
FIG. 7 is a block diagram of the camera shown in FIG. 1.

FIG. 7 is an electrical block diagram of the camera 10 incorporating an articulating capture module according to the invention. The optical section 32 directs image light from a subject (not shown) through an aperture mechanism 60 upon an image sensor, which is preferably a charge couple device (CCD) sensor 62. Exposure control, which can regulate the aperture, the exposure time, or the gain applied to the image signal, is based on a light reading taken by the photocell 38. Shuttering can be performed mechanically, either by the aperture mechanism 60 or by a separate shutter mechanism (not shown), or electronically by appropriate clocking of the CCD sensor 62. The sensor 62 generates an image signal that is processed by an analog video processor 64 before being converted into a digital image signal by an analog-to-digital (A/D) converter 66. For example, the processor 64 may adjust the gain of the output image signals according to exposure conditions determined by the photocell 38.

The digitized image signal is temporarily stored in a frame memory 68, and then processed (e.g., compressed) by a digital signal processor 70. The processed image signal is then stored in a data memory 72 and, if a removable memory card 74 is connected, transferred through a memory card interface 76 to the memory card 74. The memory card interface would typically receive a card adapted to a known standard, such as the PCMCIA card interface standard described in the *PC Card Standard, Release* 2.0, published by the Personal Computer Memory Card International Association, Sunnyvale, Calif., September, 1991.

Electrical connection between the memory card 74 and the camera 10 is maintained through a card connector 78 positioned in the memory card slot 54 (see FIGS. 5 and 6). The card interface 76 and the card connector 78 provide, e.g., an interface according to the aforementioned PCMCIA card interface standard. The processed image signal may also be sent to a host computer connected to the camera through a standard host computer interface 79 connected to the port 55 on the camera. A camera microprocessor 80 is connected generally to the elements of the camera 10, as shown in FIG. 7, for controlling the digital conversion, processing and storage of the image signal. A user interface section 82 provides the status of the aforementioned buttons and switches on the back 14a of the camera 10 to the microprocessor 80, and connects the LCD displays 42 and 44 with the microprocessor 80.

More particularly, the camera microprocessor 80 receives user input, such as a capture command, from a user interface section 82, and initiates a capture sequence by triggering the quenchable flash unit 36 (if needed) and signaling a clock driver 84 connected to the CCD sensor 62. The microprocessor 80 also provides a gain adjustment signal to the analog video processor 64, a quench or charge control to the flash unit 36, an aperture control signal to the aperture mechanism 60, and exposure time control through the driver 84.

Figure 8:
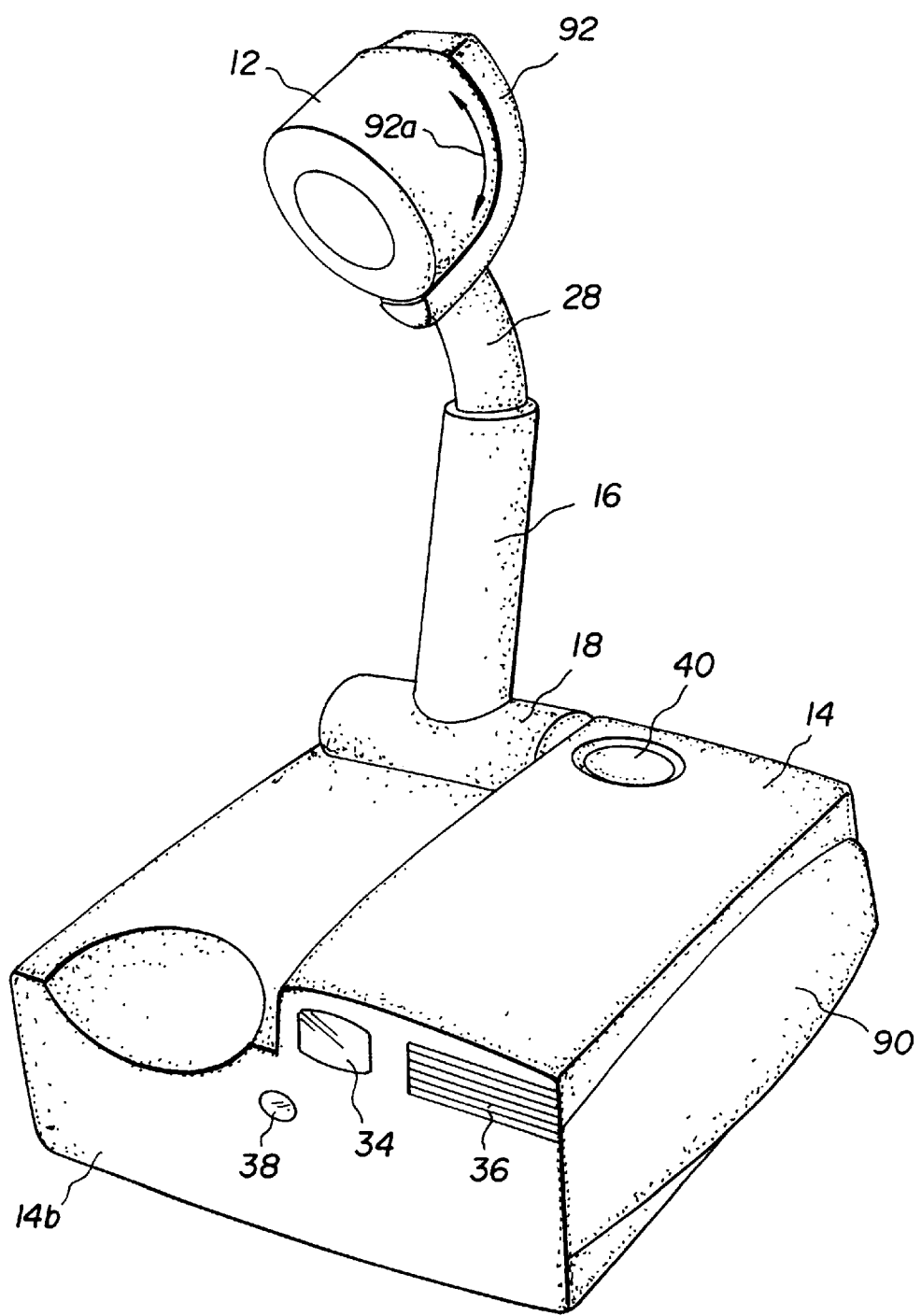
FIG. 8 is a view of a second embodiment of the camera according to the invention, showing a binocular style camera body.
Figure 9:
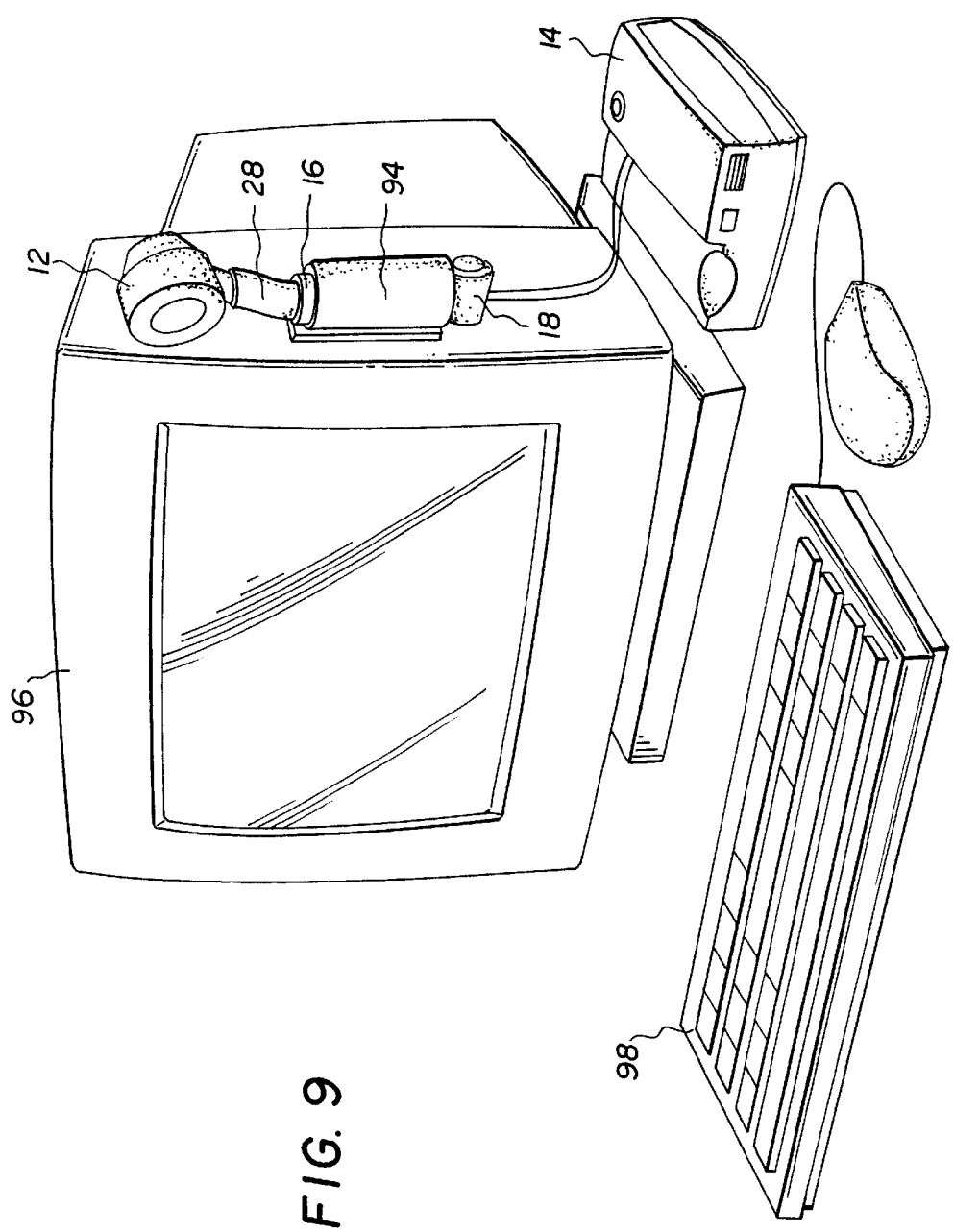
FIG. 9 is an illustration of a camera system in which the imaging module is detached from the camera shown in FIG. 8.

FIG. 8 shows a second embodiment of the digital camera 10 in which the camera body 14 is arranged in a binocular format with a hand strap 90 on one side of the body 14. The capture button 40 is on the top of the camera body 14, and the optical viewfinder 34 extends through the length of the body 14 to the front 14b on the camera 10. The flash unit 36 and the photocell 38 are also arranged on the front 14b. In this embodiment, the imaging module 12 slides on a track 92 as seen by an arrow 92a. This allows the imaging module 12 to be aligned with the optical axis of the viewfinder 34 when the arm 16 is closed against the body 14. FIG. 9 shows the same embodiment as in FIG. 8 with the additional feature of having the arm 16 and the module 12 detach from the camera body 14. The arm 16 can then be clamped into a holder 94 attached to the side of a computer monitor 96 so that the imaging module 12 can be oriented toward a computer user working at a keyboard 98 during videoconferencing, or the like.

Figure 10:
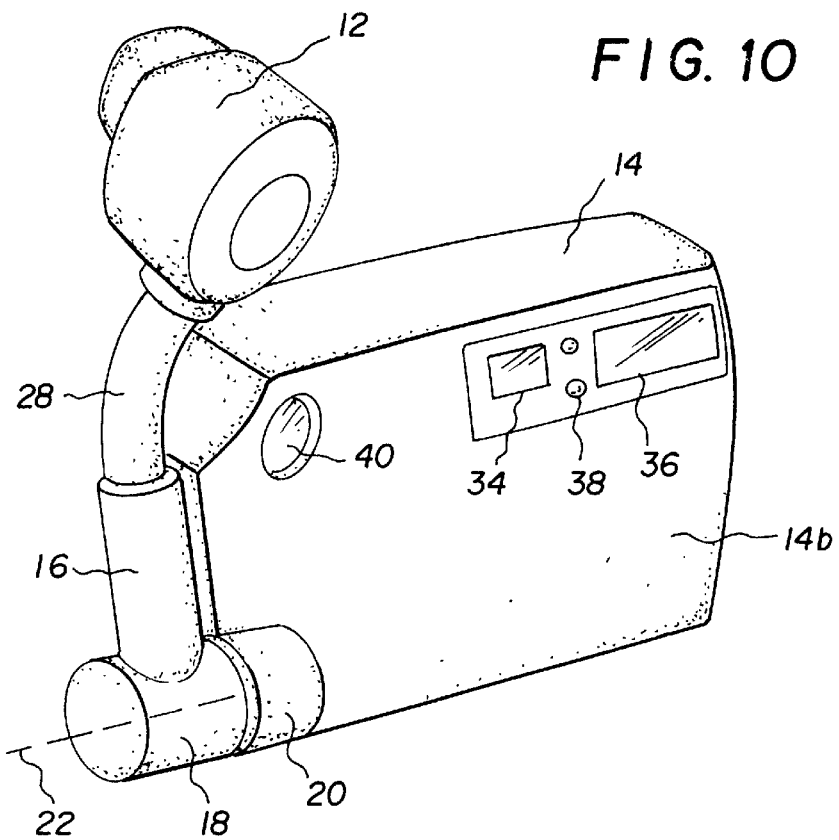
FIG. 10 is a view of a third embodiment of the camera according to the invention, showing a side-mounted articulating arm.
Figure 11:
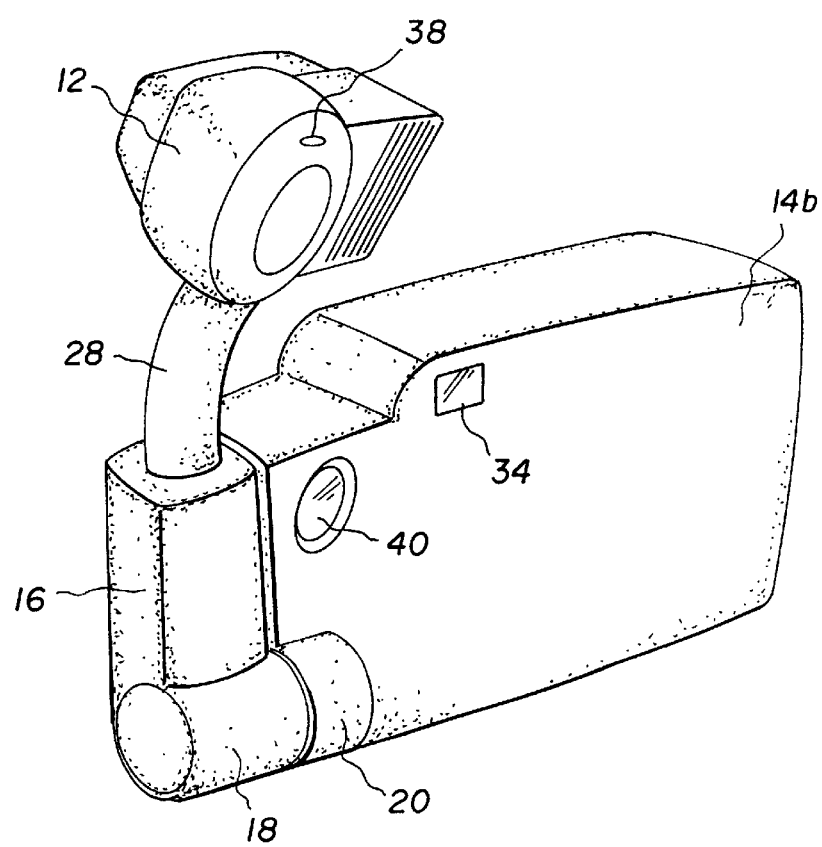
FIG. 11 is a view of a fourth embodiment of the camera according to the invention, showing a side-mounted articulating arm with a flash unit.

FIG. 10 shows a third embodiment of the invention in which the camera body 14 is arranged in a conventional rectangular format in which the arm 16 articulates about the pivot 22, which is now arranged on one side of the camera 10. In this embodiment, the optical viewfinder 34 can extend through to the front 14b of the camera body 14, rather than through the imaging module 12. FIG. 11 shows a further embodiment with many similarities to the embodiment shown in FIG. 10, except that the flash unit 36 is mounted on the imaging module 12.

The invention has been described with reference to a preferred embodiment. However, it will be appreciated that variations and modifications can be effected by a person of ordinary skill in the art without departing from the scope of the invention. For example, the feature of detaching the arm 16, as shown in FIG. 9, can be applied to any of the embodiments. Furthermore, as shown in FIG. 11, the photocell 38 may be located on the front of the imaging module 12, rather than on the front 14b of the camera body 14. Also, the imaging module 12 and the nest 26 may be configured to latch the module 12, and the arm 16 therewith, into the nest 26 when the camera 10 is used in its hand-held imaging position. For example, as shown in FIG. 4, a raised bump 100a may be provided on one side of the imaging module 12, which mates with an indentation 100b in the nest 26 to provide a latching function.

PART LIST 10 digital camera
12 imaging module
14 camera body
14a flat back
14b front surface
15 flat surface
16 elongated arm
18 connecting member
20 pivot support
22 pivot axis
24 90° angle
26 nest
28 flexible linkage
30 internal recess
32 optical section
34 optical viewfinder
36 flash unit
38 photocell
40 capture button
42 status display
44 image display
46a,b rocker switches
48 select button
50 rocker switch
52 buttons
54 memory card slot
55 host computer port
60 aperture mechanism
62 CCD sensor
64 analog video processor
66 a/d converter
68 frame memory
70 digital signal processor
72 data memory
74 memory card
76 memory card interface
78 card connector
79 host computer interface
80 camera microprocessor
82 user interface
84 clock driver
90 hand strap
92 track
94 holder
96 computer monitor
98 keyboard
100a bump
100b identation

What is claimed is:

1. An electronic camera for capturing an image of an object from both hand-held and stationary positions, said electronic camera comprising:

an imaging module containing an image sensor for capturing the image of the object;

a camera body; and means connected to the camera body for movably supporting the imaging module such that the module is capable of movement with respect to the camera body, said supporting means including a rigid section and further including a flexible linkage between the rigid section and the imaging module such that the module may be adjusted by movement of the rigid section and further adjusted by flexure of the linkage, wherein said rigid section is pivotally mounted to the camera body for articulation with respect to the camera body and said flexible linkage couples the imaging module to the rigid section such that articulation of the module may be further adjusted by flexure of the linkage.

2. The electronic camera as claimed in claim 1 wherein the camera body functions as a stand for supporting the imaging module in a desired position.

3. An electronic camera for capturing an image of an object from both hand-held and stationary positions, said electronic camera comprising:

an imaging module containing an image sensor for capturing the image of the object;

a camera body; and means connected to the camera body for movably supporting the imaging module such that the module is capable of movement with respect to the camera body, said supporting means including a rigid section and further including a flexible linkage between the rigid section and the imaging module such that the module may be adjusted by movement of the rigid section and further adjusted by flexure of the linkage, wherein the flexible linkage is extracted from one end of the rigid section and the rigid section includes an internal recess for receiving the flexible linkage when it is not being used.

* * * * *